(12) United States Patent
Nelson

(10) Patent No.: US 9,255,765 B2
(45) Date of Patent: Feb. 9, 2016

(54) SPEAR GUN SAFETY DEVICE

(71) Applicant: Eric Nelson, Boca Raton, FL (US)

(72) Inventor: Eric Nelson, Boca Raton, FL (US)

(*) Notice: Subject to any disclaimer, the term of this patent is extended or adjusted under 35 U.S.C. 154(b) by 0 days.

(21) Appl. No.: 14/600,923

(22) Filed: Jan. 20, 2015

(65) Prior Publication Data

US 2015/0204633 A1 Jul. 23, 2015

Related U.S. Application Data

(60) Provisional application No. 61/928,866, filed on Jan. 17, 2014.

(51) Int. Cl.
| | |
|---|---|
| *F41B 7/04* | (2006.01) |
| *A01K 81/00* | (2006.01) |
| *F41C 9/06* | (2006.01) |
| *F41B 11/83* | (2013.01) |

(52) U.S. Cl.
CPC . *F41B 7/04* (2013.01); *A01K 81/00* (2013.01); *F41B 11/83* (2013.01); *F41C 9/06* (2013.01)

(58) Field of Classification Search
CPC ............ F41B 7/04; F41B 3/005; F41B 7/046; F41B 11/83; A01K 81/00
USPC ............ 124/17, 20.3, 22, 27, 35.1, 40, 83, 31; 43/6
See application file for complete search history.

(56) References Cited

U.S. PATENT DOCUMENTS

| | | | | | |
|---|---|---|---|---|---|
| 1,877,215 | A | * | 9/1932 | Albisu ..................... | F41B 3/005 124/22 |
| 2,762,358 | A | * | 9/1956 | Kinnaman ................ | F41B 7/04 124/22 |
| 3,006,330 | A | * | 10/1961 | De Bach ................... | F41B 7/04 124/22 |
| 3,016,891 | A | * | 1/1962 | Ebeling ..................... | F41B 7/04 124/22 |
| 3,102,525 | A | * | 9/1963 | Englis ...................... | F41B 11/83 124/31 |
| 3,108,583 | A | * | 10/1963 | Andis ....................... | F41B 5/12 124/20.1 |
| 3,126,880 | A | * | 3/1964 | Loe ........................... | F41B 3/02 124/22 |
| 3,262,441 | A | * | 7/1966 | Senne ....................... | F41B 7/04 124/22 |
| 3,265,054 | A | * | 8/1966 | Gruenenfelder .......... | F41B 7/04 124/22 |
| 3,340,642 | A | * | 9/1967 | Vasiljevic ................. | F41B 7/04 102/504 |
| 3,364,609 | A | * | 1/1968 | Kennedy .................. | F41B 7/04 43/6 |
| 3,456,376 | A | * | 7/1969 | Chappell ................. | A01K 81/00 43/6 |
| 3,585,979 | A | * | 6/1971 | Hendricks ................ | F41B 7/04 124/22 |

(Continued)

*Primary Examiner* — Alexander Niconovich

(57) ABSTRACT

A spear gun safety device for shielding at least one spike of a spear is provided. The safety device may include a tube assembly having a firing end and an opposing handle end, forming a barrel through the length of the tube assembly, wherein the barrel is dimensioned and adapted to house the spear, including the at least one spike, but not including a perpendicularly joined band post. The tube assembly provides an elongated notch extending from the firing end toward the handle end, wherein the elongated notch is configured to guide the band post protruding therethrough. The tube assembly provides a pair of band connectors disposed near the firing end, each band connector straddling opposing sides of the elongate notch, whereby tension bands extend from the band connectors to the band post.

10 Claims, 4 Drawing Sheets

(56) References Cited

U.S. PATENT DOCUMENTS

| | | | | |
|---|---|---|---|---|
| 3,741,190 A * | 6/1973 | Lopez | F41B 7/04 | 124/22 |
| 3,773,026 A * | 11/1973 | Romero | F41B 7/04 | 124/22 |
| 3,872,853 A * | 3/1975 | Nakatani | F41B 7/04 | 124/22 |
| 3,949,729 A * | 4/1976 | Pfotenhauer | F41B 5/12 | 124/20.1 |
| 3,949,731 A * | 4/1976 | Caso | F41B 7/04 | 124/26 |
| 4,193,386 A * | 3/1980 | Rossi | F41B 7/04 | 124/22 |
| 4,318,389 A * | 3/1982 | Kiss, Jr. | F41B 7/04 | 124/22 |
| 4,894,940 A * | 1/1990 | Frain | F41G 1/35 | 362/110 |
| 4,895,128 A * | 1/1990 | Okada | F41B 7/04 | 124/22 |
| 4,962,747 A * | 10/1990 | Biller | F41B 7/046 | 124/22 |
| 5,243,955 A * | 9/1993 | Farless | F41B 3/005 | 124/20.1 |
| 5,524,603 A * | 6/1996 | Menzer | F41B 7/04 | 124/20.3 |
| 5,595,166 A * | 1/1997 | Schmidt, III | F41B 7/04 | 124/20.3 |
| 5,642,723 A * | 7/1997 | Hogan | F41B 7/003 | 124/20.3 |
| 5,904,132 A * | 5/1999 | Biller | F41B 7/04 | 12/34 |
| 5,931,145 A * | 8/1999 | Oviedo-Reyes | F41B 5/12 | 124/20.3 |
| 6,811,503 B2 * | 11/2004 | May | A01K 81/00 | 43/6 |
| 6,953,034 B2 * | 10/2005 | May | A01K 81/00 | 124/17 |
| 7,726,291 B2 * | 6/2010 | Pedemonte | F41B 7/046 | 124/20.3 |
| 7,827,978 B2 * | 11/2010 | Pedemonte | F41B 7/04 | 124/20.3 |
| 8,387,602 B1 * | 3/2013 | Bruington | F41B 7/04 | 124/20.3 |
| 2012/0085330 A1 * | 4/2012 | Hickerson | A01K 81/04 | 124/22 |

\* cited by examiner

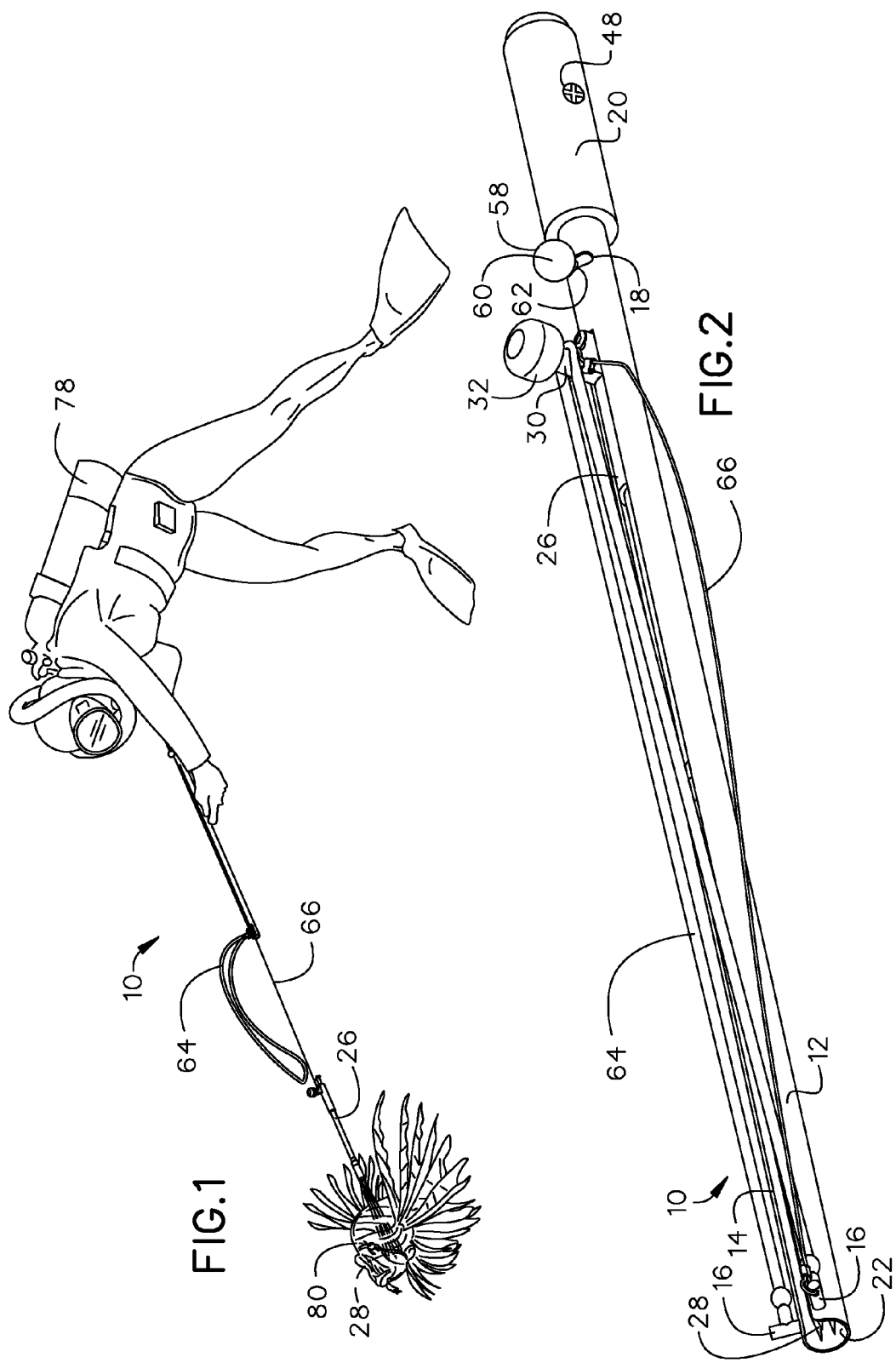

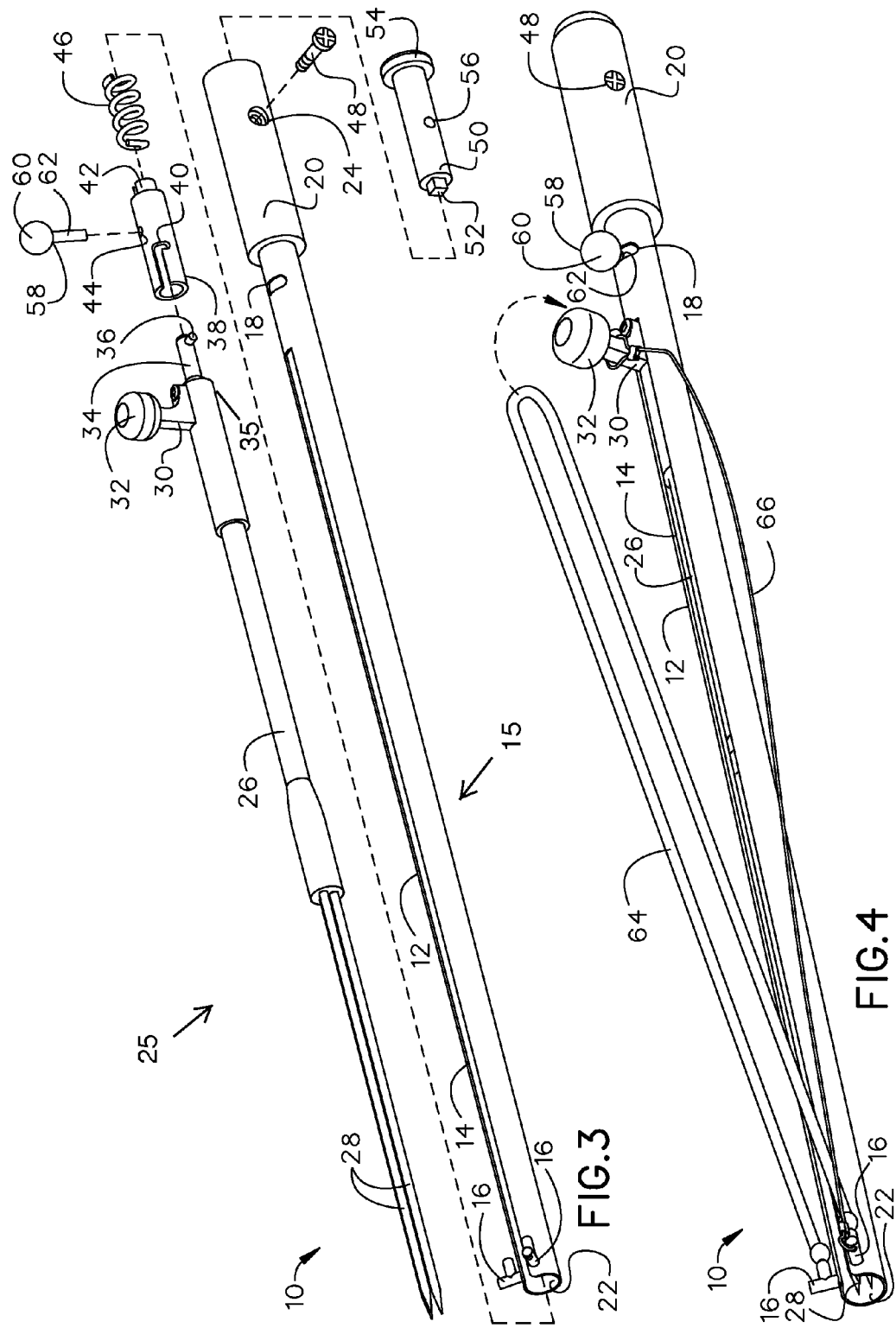

SPEAR GUN SAFETY DEVICE

CROSS-REFERENCE TO RELATED APPLICATION

This application claims the benefit of priority of U.S. provisional application number 61/928,866, filed 17 Jan. 2014, the contents of which are herein incorporated by reference.

BACKGROUND OF THE INVENTION

The present invention relates to spear guns and, more particularly, to a safety device for band-powered spear guns that encloses the spear tip(s), but does not diminish the operation of the spear gun.

Current spear polls and spear guns always have the spear tip exposed when operable. Such tip exposure can be dangerous, leading to accidents involving the user, dive buddies or others.

As can be seen, there is a need for a safety device for band-powered spear guns that encloses the spear tip(s), but does not diminish the operation of the spear gun.

SUMMARY OF THE INVENTION

In one aspect of the present invention, a safety device for shielding at least one spike of a spear of a band-powered spear gun, wherein the opposing spear butt end of the spear has a generally perpendicularly joined band post, comprises: a tube having a firing end and an opposing handle end, forming a barrel through the length of the tube; an elongated notch extending from the firing end toward the handle end; and a pair of band connectors disposed near the firing end, wherein the barrel is dimensioned and adapted to house the spear so that the band post protrudes through the elongated notch In another aspect of the present invention, a safety system for shielding at least one spike of a spear of a band-powered spear gun comprises: a spear comprising: a spear shaft providing the at least one spike on one end, wherein the spear shaft terminates at a spear butt on an opposing end; and a band post perpendicularly joined near the spear butt; and a tube assembly comprising: a tube having a firing end and an opposing handle end, forming a barrel through the length of the tube; an elongated notch extending from the firing end toward the handle end; and a pair of band connectors disposed near the firing end, wherein the barrel is dimensioned and adapted to house the spear so that the band post protrudes through the elongated notch.

These and other features, aspects and advantages of the present invention will become better understood with reference to the following drawings, description and claims.

BRIEF DESCRIPTION OF THE DRAWINGS

FIG. 1 is a perspective view of an exemplary embodiment of the present invention, shown in use;

FIG. 2 is a perspective view of an exemplary embodiment of the present invention, shown in the locked configuration;

FIG. 3 is an exploded view of an exemplary embodiment of the present invention, omitting a tension band and a leash cable for illustrative clarity;

FIG. 4 is a perspective view of an exemplary embodiment of the present invention, demonstrating a cocking method;

DETAILED DESCRIPTION OF THE INVENTION

Figure 5:
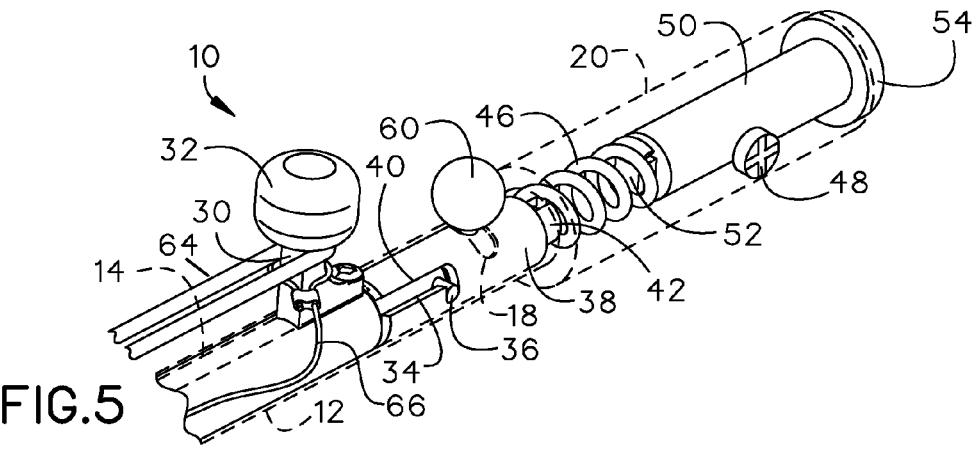
FIG. 5 is a detailed perspective view of an exemplary embodiment of the present invention, with a tube assembly shown in hidden line to demonstrate internal mechanism in a locked configuration.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a spear gun safety device for shielding at least one spike of a spear is provided. The safety device may include a tube assembly having a firing end and an opposing handle end, forming a barrel through the length of the tube assembly, wherein the barrel is dimensioned and adapted to house the spear, including the at least one spike, but not including a perpendicularly joined band post. The tube assembly provides an elongated notch extending from the firing end toward the handle end, wherein the elongated notch is configured to guide the band post protruding therethrough. The tube assembly provides a pair of band connectors disposed near the firing end, each band connector straddling opposing sides of the elongate notch, whereby tension bands extend from the band connectors to the band post.

Referring to FIGS. 2 through 4, the present invention includes a spear gun safety device 10 having a spear 25, a locking assembly, a trigger assembly, a projective assembly, and a tube assembly 15.

The spear 25 may include a spear shaft 26 terminating in at least one spike 28 on one end and a spear butt 35 on its opposing end, as illustrated in FIG. 3. The spear butt 35 may provide a band post 30 for cocking the device 10. The band post 30 may include a band post handle 32. The post 30 and its handle 32 may be sized and dimensioned to hold at least one tension band 64.

The tube assembly 15 may provide a tube 12 having a firing end and an opposing handle end so as to define a barrel 22 extending through the tube 12. The handle end may provide a tubular handle 20 having a handle fastener hole 24. The tube 12 may form an elongated notch 14 extending from the firing end toward the tubular handle 20, as illustrated in FIGS. 3 and 4. The firing end may include suitable spaced band connectors 16. The band connectors 16 may straddle opposing sides of the elongated notch 14. The tube 12 may define a trigger slot 18 disposed between the elongated notch 14 and the tubular handle 20. The barrel 22 may be sized and dimensioned so as to slidably receive the entire spear 25 so the at least one spike 28 does not protrude out of the barrel 22, as illustrated in FIG. 2. The elongated notch 14 may be sized and dimensioned to guide the band post protruding therethrough.

The present invention may include a cocking method wherein each tension band 64 may be stretched between the band post 30 and a band connector 16 of the tube assembly 15, as illustrated in FIG. 4. A leash cable 66 may interconnect the spear 25 to the tube assembly 15, wherein the leash cable 66 retains possession of the spear 25 after it is projected from the barrel 22, as illustrated in FIG. 1.

Figure 8:
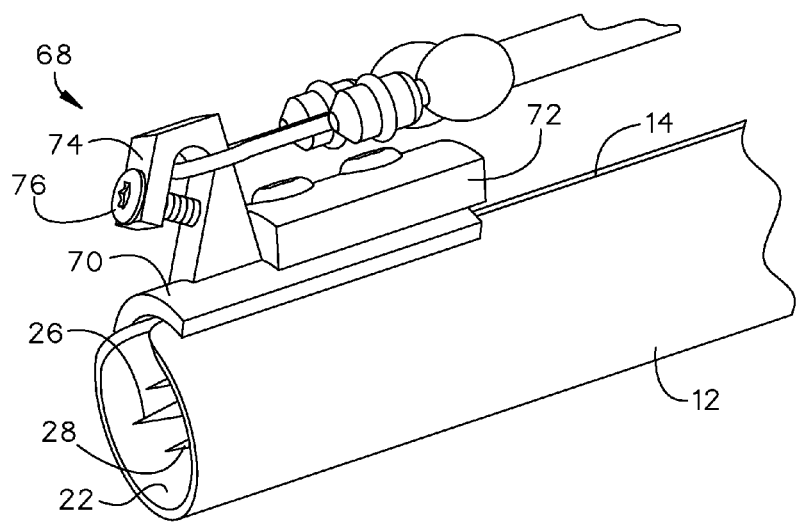
FIG. 8 is a perspective detail view of an exemplary embodiment of the present invention, shown in a locked configuration.
Figure 9:
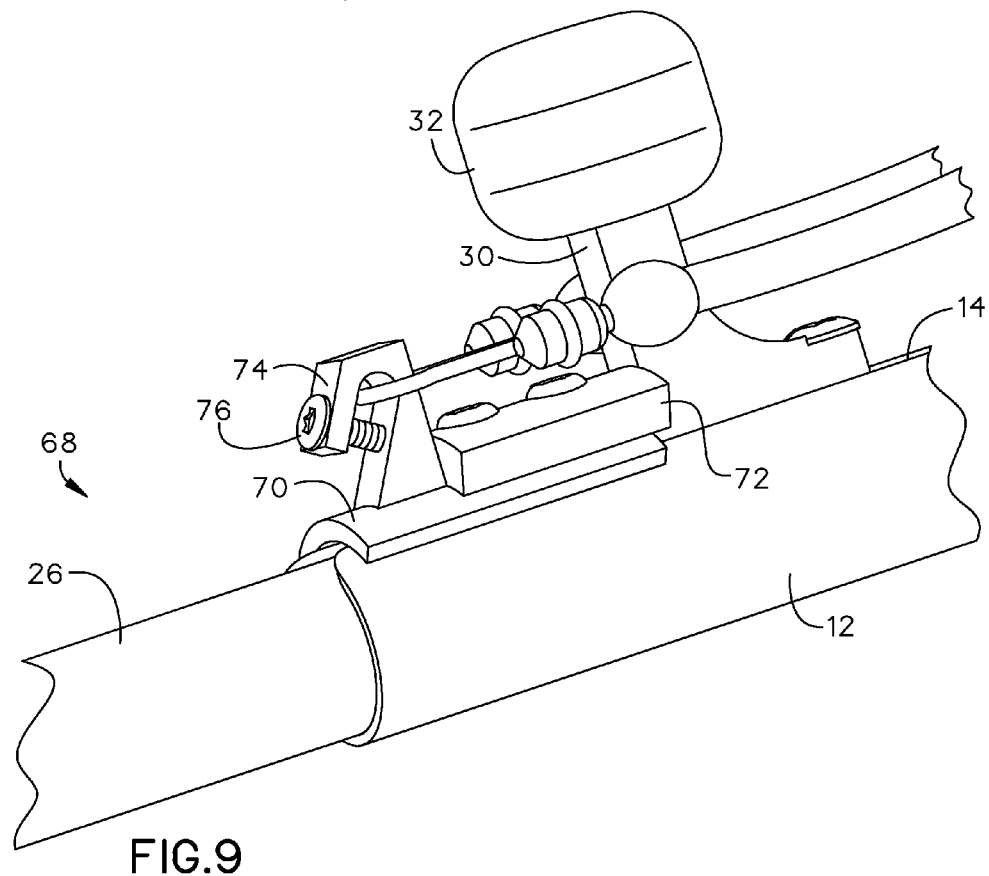
FIG. 9 is a perspective detail view of an exemplary embodiment of the present invention, shown in a projectile configuration.

In certain embodiments, the tension band 64 may be stretched between the band post 30 and a bracket connector 68 near the firing end of the tube assembly 15, to provide the cocking method, as illustrated in FIGS. 8 and 9. The bracket connector 68 may include a bumper bracket 70 connected to the firing end. The bumper bracket 70 may provide a stopper 72, a fastener hook 74 and a bumper fastener 76. The fastener hook 74 and the bumper fastener 76 are used to detachably connect the tension band 64 to the bumper bracket 70. The stopper 72 may be disposed and adapted so that an operator 78 may project the at least one spike 28 from the barrel 22 yet retain its spear butt 35 within the barrel 22. In such embodiments, the elongated notch 14 is "closed" near the firing end, as illustrated in FIGS. 8 and 9. In some embodiments, the elongated notch 14 may terminate inward from the firing end of the tube 12 so as to be closed.

The trigger assembly may provide a holding cylinder 38, a spring 46, and a spring anchor 50. The holding cylinder 38 may extend from a receiving end to an opposing spring end. The holding cylinder 38 may be tubular, forming an L-shaped slot 40 extending from the receiving end, as illustrated in FIG. 3. The holding cylinder 38 may form a trigger hole 44 for operably engaging a trigger 58. The trigger 58 may include a shaft 62 and joined handle 60, wherein the shaft 62 is received through the trigger slot 18 of the tube assembly 15 and into the trigger hole 44. The spring end may be substantially closed off by a spring nub 42.

The spring anchor 50 may extend from an anchor nub 52 to an opposing end cap 54. The spring anchor 50 may provide an anchor fastener hole 56. The spring anchor 50 may be dimensioned and adapted to slide into the tubular handle 20 so that the anchor fastener hole 56 aligns with the handle fastener hole 24, wherein a hole fastener 48 may securely attach the spring anchor 50 to the tubular handle 20.

The spring 46 may be disposed between the anchor nub 52 and the spring nub 42, as illustrated in FIG. 3.

The locking assembly may include a spear tail 34 extending from the spear butt 35 of the spear 25. The spear tail 34 may provide a generally perpendicularly joined lock post 36. The spear tail 34 may be dimensioned and adapted to be received within the receiving end of the holding cylinder 38 so that the lock post 36 may ride the L-shaped slot 40 to a locked configuration.

Figure 6:
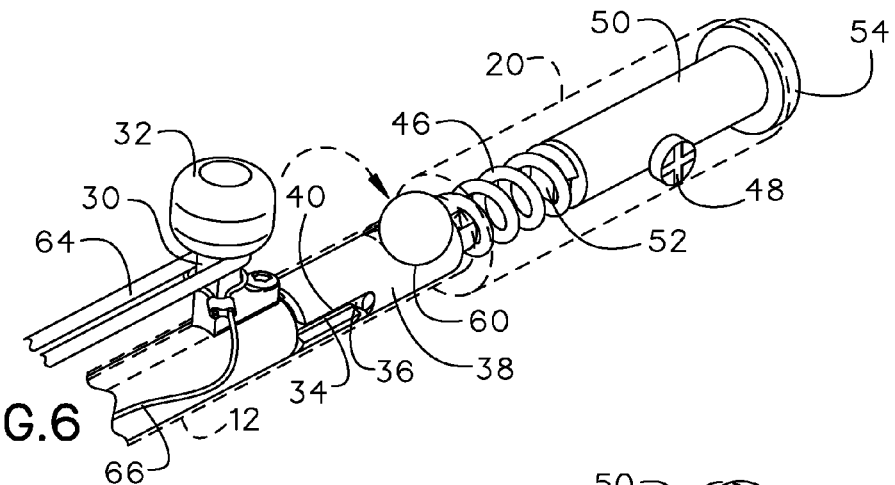
FIG. 6 is a detailed perspective view of an exemplary embodiment of the present invention, with the tube assembly shown in hidden line to demonstrate internal mechanism in an unlocked configuration.
Figure 7:
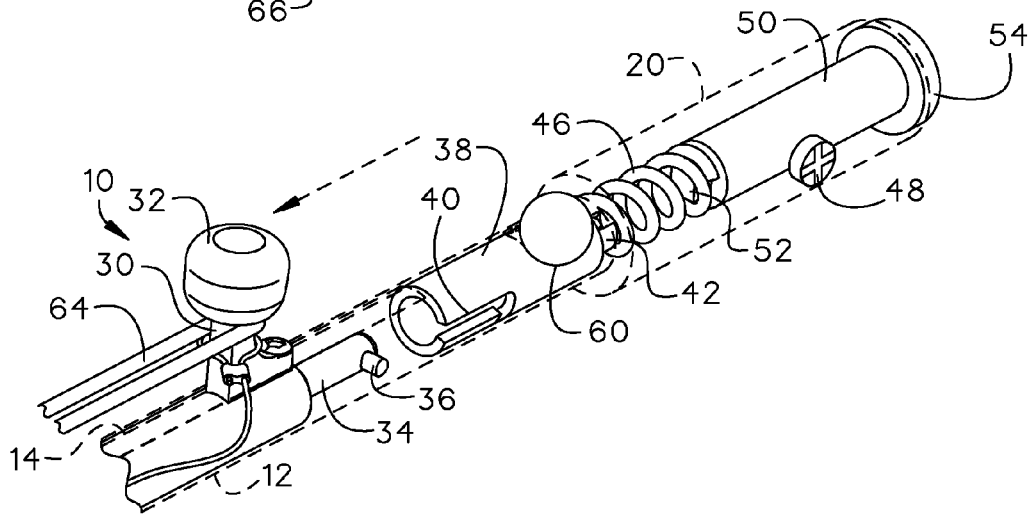
FIG. 7 is a detailed perspective view of an exemplary embodiment of the present invention, with the tube assembly shown in hidden line to demonstrate internal mechanism in a projectile configuration.

The holding cylinder 38 is disposed in the tubular handle 20, allowing the holding cylinder 38 to rotate relative to the tubular assembly by manipulating the trigger 58 joined to the holding cylinder 38. When the lock post 36 rides the "foot portion" of the L-shaped slot 40, such rotation is limited to moving from the locked configuration to an unlocked configuration, as illustrated in FIGS. 5 and 6, respectively. In certain embodiments, the trigger slot 18 also limits aforementioned rotation. In the unlocked configuration the lock post 36 is disposed in the "leg portion" of the L-shaped slot 40. In the locked configuration, the spring 46 may store mechanical energy to be released in the unlocked configuration, resulting in the projection of the spear 25 also under the influence of the elastic tension bands 64, as illustrated in FIG. 7.

A method of using the present invention may include the following. Providing the spear gun safety device 10 disclosed above. The operator 78 may hold the tubular assembly with one hand semi-horizontally allowing the tension band 64 to hang down. Positioning the band post 30 close the tension band 64, the operator 78 may loop the band 64 around the band post 30. With one hand holding tube assembly 15, the other hand may pull the post 30 back to so that the lock post 36 rides the L-shaped slot 40 to the locked configuration, providing the cocking method.

Now with their dominant hand, the operator 78 may hold the spear gun safety device 10 away from your body with the firing end pointed at a target 80. Moving the band post 30 to the unlocked configuration, projects the spear 25 through the barrel 22. In certain embodiments, if the target 80 is speared the operator 78 can move the spear 25 back into barrel 22 so that the spear 25 can be conveniently pulled out of the target 80.

The present invention may be used with any pole that fits inside the tube assembly 15, such as a "bang stick", a cattle prod, a branding prod, fauna needle, and the like.

It should be understood, of course, that the foregoing relates to exemplary embodiments of the invention and that modifications may be made without departing from the spirit and scope of the invention as set forth in the following claims.

What is claimed is:

1. A safety system for shielding at least one spike of a spear of a band-powered spear gun, comprising:
   a spear comprising:
      a spear shaft providing the at least one spike on one end, wherein the spear shaft terminates at a spear butt on an opposing end;
      a band post perpendicularly joined near the spear butt;
      a spear tail extending from the spear butt; and
      a lock post extending from the spear tail;
   a tubular holding cylinder forming a L-shaped slot dimensioned so that the lock post rides along an entirety of the L-shaped slot as the spear tail slides within the tubular holding cylinder; and
   a tube assembly comprising:
      a tube having a firing end and an opposing handle end, forming a barrel through a length of the tube;
      an elongated notch extending from the firing end toward the handle end; and
      a pair of band connectors disposed near the firing end, wherein the barrel is dimensioned and adapted to house the spear and the tubular holding cylinder so that the band post protrudes through the elongated notch, wherein the tubular holding cylinder is disposed near the opposing handle end.

2. The safety system of claim 1, wherein each band connector straddles opposing sides of the elongate notch.

3. The safety system of claim 1, further comprises
   a trigger removably attached generally perpendicularly to the holding cylinder.

4. The safety system of claim 3, wherein the tube assembly further comprises a trigger slot disposed between the elongated notch and the opposing handle end so that the trigger may operably protrude therethrough.

5. The safety system of claim 4, further comprising at least one tension band extendable from the each band connector to the band post.

6. The safety system of claim 1, wherein each band connector further comprises a bracket bumper closing off the elongate notch.

7. A safety device for shielding at least one spike of a spear of a band-powered spear gun, wherein an opposing spear butt end of the spear has a generally perpendicularly joined band post, comprising:
   a spear tail extending from the spear butt;
   a lock post extending from the spear tail;

a tubular holding cylinder forming a L-shaped slot dimensioned so that the lock post rides along an entirety of the L-shaped slot as the spear tail slides within the tubular holding cylinder; and a tube having a firing end and an opposing handle end, forming a barrel through a length of the tube;

an elongated notch extending from the firing end toward the handle end; and a pair of band connectors disposed near the firing end, wherein the barrel is dimensioned and adapted to house the spear and the tubular holding cylinder so that the band post protrudes through the elongated notch, wherein the tubular holding cylinder is disposed near the opposing handle end.

8. The safety device of claim 7, wherein each band connector straddles opposing sides of the elongate notch.

9. The safety system of claim 7, wherein the tube assembly further comprises a trigger slot disposed between the elongated notch and the opposing handle end.

10. The safety system of claim 7, wherein each band connector further comprises a bracket bumper closing off the elongate notch.

\* \* \* \* \*